(12) United States Patent
Sharma et al.

(10) Patent No.: US 7,869,890 B2
(45) Date of Patent: Jan. 11, 2011

(54) KEYBOARDS HAVING MULTIPLE GROUPS OF KEYS IN THE MANAGEMENT OF A PROCESS CONTROL PLANT

(75) Inventors: Ashish Sharma, New Delhi (IN); Manish Sharma, Bangalore (IN); Srinivasan Rajagopal, Bangalore (IN); Rajesh Ramesh, Bangalore (IN); Benoy Joseph, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1051 days.

(21) Appl. No.: 11/309,655

(22) Filed: Sep. 6, 2006

(65) Prior Publication Data

US 2008/0058968 A1 Mar. 6, 2008

(51) Int. Cl.
*G05B 15/00* (2006.01)
*G05B 11/01* (2006.01)
*H03K 17/94* (2006.01)
*H03M 11/00* (2006.01)
*H04L 17/02* (2006.01)

(52) U.S. Cl. .................. 700/84; 700/17; 341/22; 341/173

(58) Field of Classification Search .................. 700/17, 700/83, 84; 341/20, 22, 26, 173, 176
See application file for complete search history.

(56) References Cited

U.S. PATENT DOCUMENTS

| | | | | |
|---|---|---|---|---|
| 3,662,382 A | * | 5/1972 | Janis | 341/22 |
| 4,303,973 A | | 12/1981 | Williamson, Jr. et al. | |
| 4,655,621 A | * | 4/1987 | Holden | 400/100 |
| 4,836,700 A | * | 6/1989 | Jensen | 400/489 |
| 5,038,268 A | * | 8/1991 | Krause et al. | 700/16 |
| 5,243,331 A | | 9/1993 | McCausland et al. | |

(Continued)

FOREIGN PATENT DOCUMENTS

EP 0559241 A2 9/1993

(Continued)

OTHER PUBLICATIONS

CENTUM CS 1000 Production Control System System Overview, Technical Information from TI 33S01B10-01E 7th Edition, pp. 1-165, Yokogawa Electric Corporation, 2-9-32, Nakacho, Musashino-shi, Tokyo, 180-8750 Japan, 7th Edition Sep. 2002.

(Continued)

*Primary Examiner*—Crystal J Barnes-Bullock
(74) *Attorney, Agent, or Firm*—Naren Thappeta

(57) ABSTRACT

A parallel operation keyboard (POK) which enables a user to provide multiple inputs simultaneously in managing a process control plant. A lock is provided to disable such simultaneous inputs. In an embodiment, multiple groups of keys are provided, with each group of keys being operable independently to modify the parameter value of a corresponding control loop. A network management station (NMS) and a server are designed to provide a suitable interface. In one implementation, each group of keys contains four keys respectively specifying increasing the parameter value, decreasing the parameter value, manual mode (in which the present level of the variable is controlled by the increase/decrease keys) and normal mode (in which the set point, i.e., the desired value, for the variable is controlled).

17 Claims, 9 Drawing Sheets

U.S. PATENT DOCUMENTS

| | | | |
|---|---|---|---|
| 5,365,154 A * | 11/1994 | Schneider et al. | 318/103 |
| 5,486,823 A * | 1/1996 | Tsai | 341/22 |
| 5,544,130 A * | 8/1996 | Mizuno et al. | 369/1 |
| 5,673,040 A * | 9/1997 | Hargreaves et al. | 341/22 |
| 5,771,920 A * | 6/1998 | Jewett et al. | 137/460 |
| 5,861,821 A * | 1/1999 | Kato et al. | 341/22 |
| 5,872,995 A * | 2/1999 | Chaiken | 710/5 |
| 5,920,476 A * | 7/1999 | Hennessey et al. | 700/17 |
| 6,522,283 B1 * | 2/2003 | Shiga et al. | 341/176 |
| 6,542,091 B1 * | 4/2003 | Rasanen | 341/22 |
| 6,595,924 B2 * | 7/2003 | Kawae et al. | 600/437 |
| 6,654,827 B2 * | 11/2003 | Zhang et al. | 710/62 |
| 6,727,829 B2 * | 4/2004 | Jam | 341/20 |
| 6,765,502 B2 * | 7/2004 | Boldy et al. | 341/22 |
| 6,768,428 B1 * | 7/2004 | Readler | 341/26 |
| 6,975,203 B2 * | 12/2005 | Brookbank et al. | 340/5.26 |
| 2002/0160807 A1 | 10/2002 | Robertson et al. | |

FOREIGN PATENT DOCUMENTS

| | | | |
|---|---|---|---|
| JP | 56143041 A | | 11/1981 |
| JP | 57172435 A | | 10/1982 |
| JP | 57191734 A | | 11/1982 |
| JP | 58003020 A | | 1/1983 |
| JP | 60235225 A | | 11/1985 |
| JP | 60241148 A | | 11/1985 |
| JP | 61112225 A | | 5/1986 |
| JP | 61131101 A | | 6/1986 |
| JP | 61148521 A | | 7/1986 |
| JP | 62015619 A | | 1/1987 |
| JP | 62063328 A | | 3/1987 |
| JP | 63208916 A | | 8/1988 |
| JP | 03102453 A | | 4/1991 |
| JP | 03110617 A | | 5/1991 |
| JP | 04100139 A | | 4/1992 |
| JP | 04205311 A | | 7/1992 |
| JP | 05011812 A | | 1/1993 |
| JP | 06289971 A | | 10/1994 |
| JP | 07295705 A | | 11/1995 |
| JP | 10003336 A | | 1/1998 |
| JP | 2001219324 A | * | 8/2001 |

OTHER PUBLICATIONS

Yokogawa Electric Corp., Technical Information: Centum CS3000 Integrated Production Control System, 6th Ed [Online] Sep. 2002, pp. 1-3-30, URL:http://www.zimmerliag.com/htm/..

Yokogawa Electric Corp., Technical Information: Centum CS1000 Production Control System, 7th Ed [Online] Sep. 2002, pp. 1-2-8, URL:http//www.zimmerliag.com/htm/...

Yokogawa Electric Corp., General Specification: Model AIP826 Operation Keyboard, 3rd Ed [Online] Jun. 1999, pp. 1-2, URL:http://gscatalogs.us.yokogawa.com...

Yokogawa Electric Corp., General Specification: Centum CS3000: Model LHS1100, 7th Ed [Online] Sep. 2004, pp. 1-7, URL:http://aspzone.us.yokogawa.com...

* cited by examiner

KEYBOARDS HAVING MULTIPLE GROUPS OF KEYS IN THE MANAGEMENT OF A PROCESS CONTROL PLANT

BACKGROUND OF THE INVENTION

1. Field of the Invention

The present invention generally relates to process control systems, and more specifically to a method and apparatus for enhancing the flexibility and control when operating with keyboards having multiple groups of keys in the management of a process control plant.

2. Related Art

A process control plant generally contains several equipment (e.g., boilers, filters, furnaces, coolers, etc.), which are used to implement a desired control process (e.g., oil refinery, manufacturing operation, etc.). Each equipment in turn generally includes devices such as actuators (such as valves and switches) and sensors, which are specifically operable by appropriate control commands to implement the desired control processes.

In one example prior approach, a control process is defined by several control loops, with each loop specifying an input device from which to receive values of a variable (e.g., present temperature) and send control commands to output devices depending on the received values and rules pre-specified for the control loops. The control loop may be defined by various points such as set points (which indicate the desired steady state value of a variable). A process controller may issue device commands as specified in the rules to implement the configured control process.

In general, operators are provided the ability to monitor and control (in general manage) the operation of various equipment/devices by providing appropriate inputs using a network management station (NMS). In the example approach of above, an operator may cause NMS to send control commands requesting the value of a variable used in a control loop, and then cause the NMS to set the set points to new values (which causes the process controller to issue device commands to gradually attain the new value for the variable).

Keyboards and associated interfaces often determine the various usability related features in the management of process control plants. One prior approach described in a document entitled, "CENTUM CS 1000 Production Control System Overview: TI 33S01B10-01E", from Yokogawa Electric Corporation, 2-9-32, Nakacho, Musasbino-shi, Tokyo, 180-8750 Japan, discloses a single keyboard in which multiple groups of keys, each appearing to provide the ability to control a corresponding device or a control loop.

One problem with such a keyboard appears to be that an operator has access to the entire set of keys, including the groups and the other keys which may facilitate various other management tasks.

It is generally desirable that a NMS provide increased control and yet ease of usability in the management of process control plants.

SUMMARY

A parallel operating keyboard (POK) provided according to an aspect of the present invention enables an operator to select multiple keys simultaneously and a corresponding number of control loops are controlled accordingly.

According to another aspect of the present invention, a lock is provided to disable the simultaneous operation of multiple control loops from a POK. In an embodiment, the POK and a general keyboard (GKB) are provided as separate units, with the GKB being operable even when the POK is locked.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, which are described below briefly.

DETAILED DESCRIPTION

1. Overview

A system provided according to an aspect of the present invention enables an operator to simultaneously select multiple keys on a keyboard, and a state of corresponding number of control loops is changed in response. As a result, the speed with which operators can provide inputs in the management of a process control plant is enhanced.

A lock is provided according to another aspect of the present invention, which disables such simultaneous changing of states. Thus, unexpected and unwanted changes may be optionally avoided. In an embodiment described below, such lock is provided as a hardware implementation integrated into a keyboard. However, the lock feature can be implemented in software in other parts of the management system as well.

In an embodiment, a system displays the state of multiple control loops in corresponding portions of a display screen. The number of portions can be equal to a number of groups of keys provided on the keyboard, with each group containing the same number of keys with similar functions. In the described embodiment, each group contains a raise key (to increase the level of the state), a lower key (to decrease the level), a normal mode key (which causes the set point of the state to be modified) and a manual mode key (which causes the present level to change).

According to another aspect of the present invention, a station (with which an operator interfaces directly) is implemented to associate each displayed control loop with a corresponding groups of keys based on the order in which the portions are displayed in a display screen. For example, the left most group of keys is associated with the left most display and the right most group is associated with the right most display. As a result, the operator can intuitively associate each group of keys with the corresponding control loops.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1A:
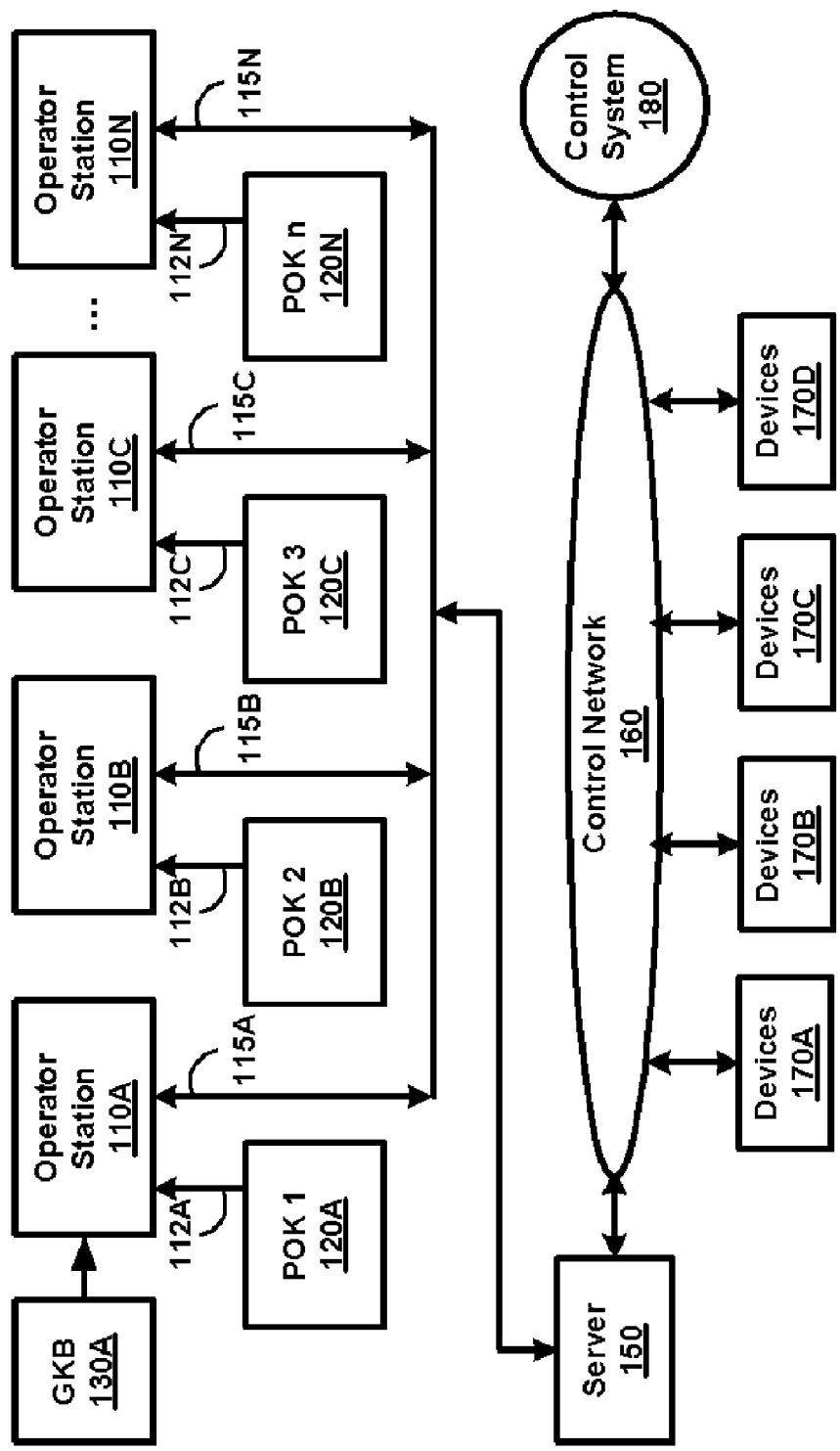
FIG. 1A is a block diagram illustrating an example environment in which various aspects of the present invention can be implemented.

FIG. 1A is a block diagram illustrating the details of an example environment in which several aspects of the present invention can be implemented. The block diagram is shown containing operator stations 110A-110N, parallel operation keyboards (POK) 120A-120N, general keyboard (GKB) 130A, server 150, control network 160, devices 170A-170D, and control system 180. Merely for illustration, only a small number of components are shown. Typical deployments generally contain many more components of similar or different types as well. Each block of FIG. 1A is described in further detail below.

Devices 170A-170D generally operate according to control commands received from control system 180, and are designed to implement a desired control process. Each device generally provides any information requested in a response, as well as to respond to any configuration requests (typically by setting the appropriate variable) contained in the received control commands. In general, the devices are contained is corresponding equipment (not shown).

Control network 160 provides connectivity between server 150, control system 180 and devices 170A-170D. The control commands between devices 170A-170D and control system 180 and can be implemented using protocols such as HART and Foundation FieldBus well known in the relevant arts. On the other hand, the communication between server 150 and control system 180 can be implemented using any protocol, as is well known in the relevant arts. The network merely provides transport for communications between server 150 and control system 180, and between devices 170A-170D and control system 180.

Figure 1B:
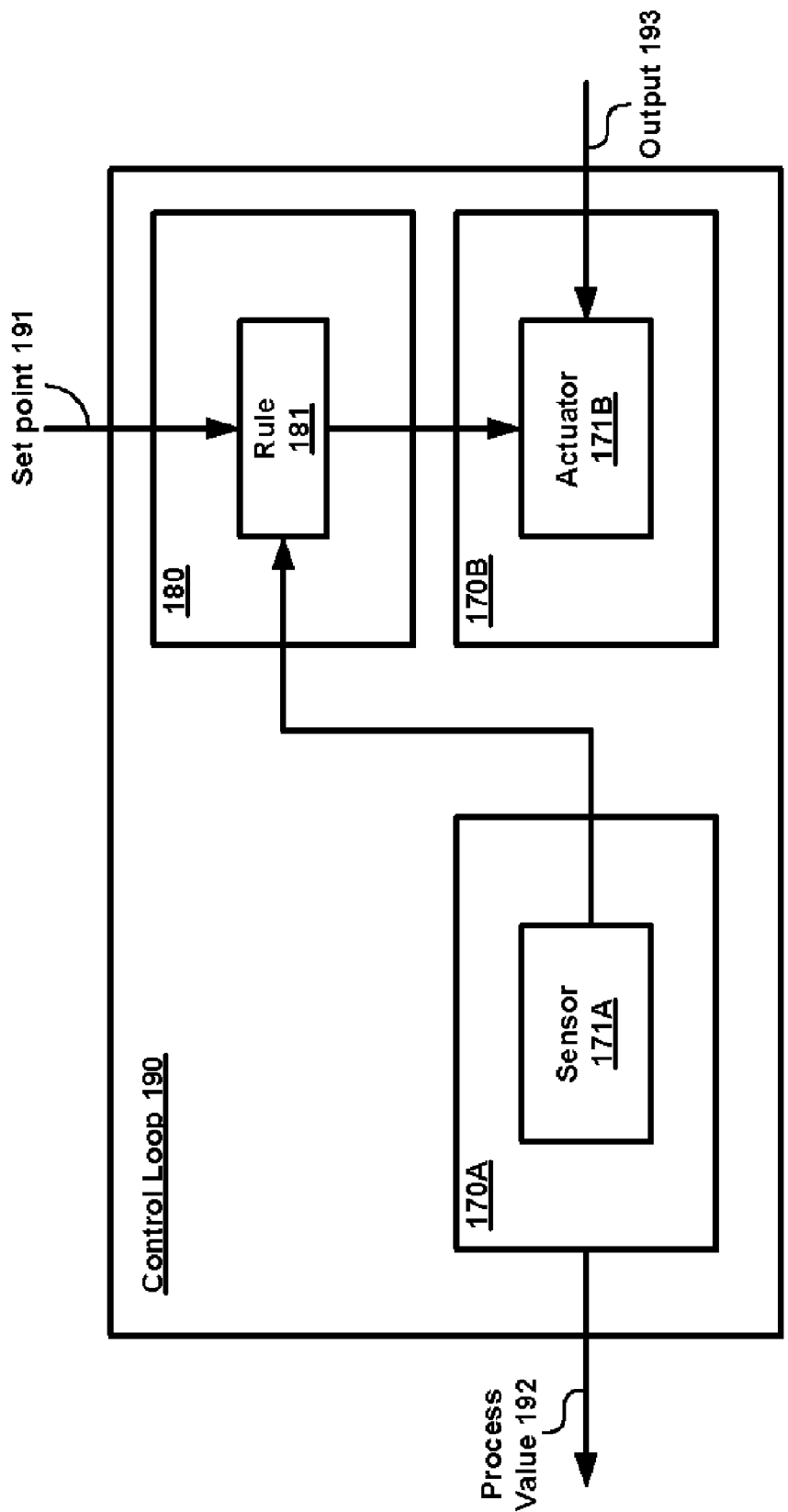
FIG. 1B is a block diagram illustrating the manner in which control loops are implemented based on devices present in various equipments.

Control system 180 issues control commands to devices 170A-170D according to either the pre-configured control loops or specific management commands received from server 150. A control loop 190 is illustrated generally with reference to FIG. 1B, which shows sensor 171A in input device 170A providing process value 192 (representing the present state of control loop 190), and a determination is made as to the specific manner in which to control actuator 171B (in output device 170B) according to rule 181 implemented in control system 180. In response, a management command may be received to change set point 191 or to change output 193 (generally to manually override automatic operation according to set point/rule otherwise) to a new value. Though shown as different devices, a single device can operate as both input and output device.

Continuing with reference to FIG. 1A, Operator stations 110A-110N provide a suitable user interface using which an operator can manage the various equipment in the process control plant. In an embodiment, each operator station is provided with a POK and GKB, though only a single GKB is shown in the Figure. In general, an operator may cause issuance of management commands to control system 180 using either operator stations or server 150, which are individually referred to as a network management station. Operator stations 110A-110N are respectively connected to POK 120A-POK 120N via respective paths 112A-112N, and to server 150 via respective paths 115A-115N.

GKB 130A is used in conjunction with an interface which require selection of specific control loop and provide inputs to control the selected control loops. GKB 130A may provide data indicating selection of only one key at a given time, thereby permitting control of only a single control loop at a given time. The user may select one of several control loops displayed on a display screen, and provide the inputs to the selected control loop.

Server 150 receives various interface commands (either from operator stations 110A-110N or from an operator directly from keyboards) and generates corresponding management commands to control system 180. Server 150 provides appropriate data for incorporation into various screens displayed at operator stations 110A-110N. The data may be formed from local data or from data received from devices (via control system 180).

According to various aspects of the present invention, a management system containing control system 180, operator stations 110A-110N, POKs 120A-120N, and GKB 130A enhance the speed with which operators can provide inputs in the management of a process control plant, as described below in further detail. Merely for illustration, a GKB is shown with one of the operator stations. However, each station may be provided with a corresponding GKB.

3. Parallel Operation Keyboard (POK)

Figure 2:
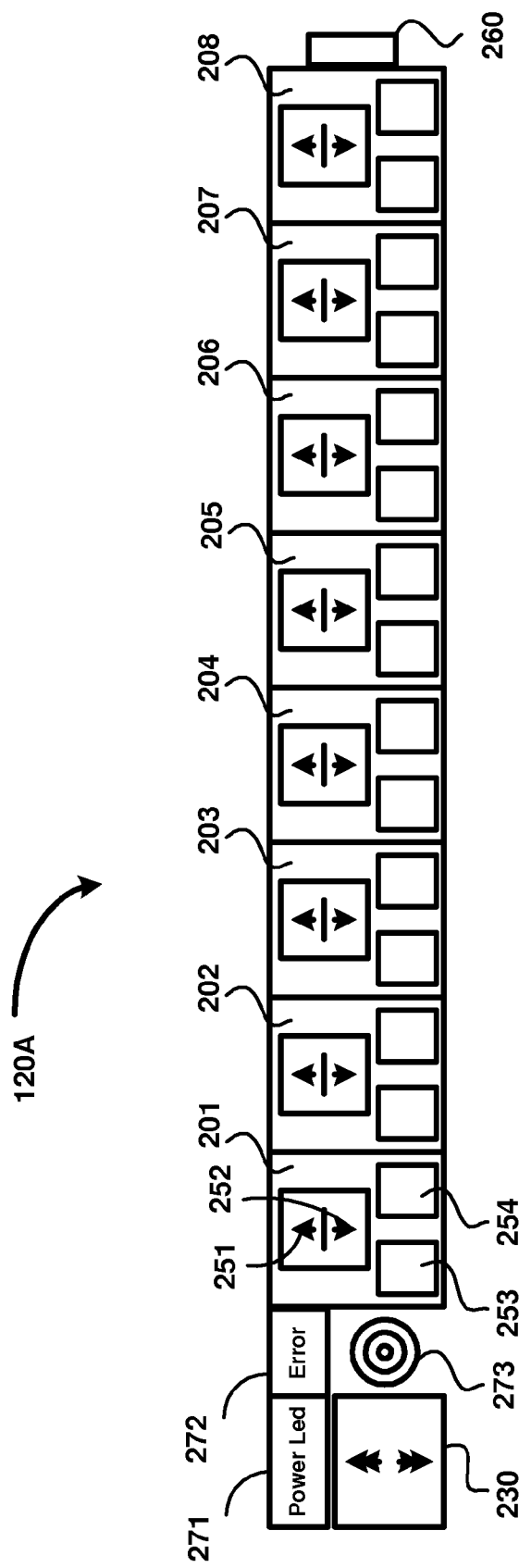
FIG. 2 is a block diagram illustrating the details of a parallel operation keyboard (POK) in an embodiment of the present invention.
Figure 3A:
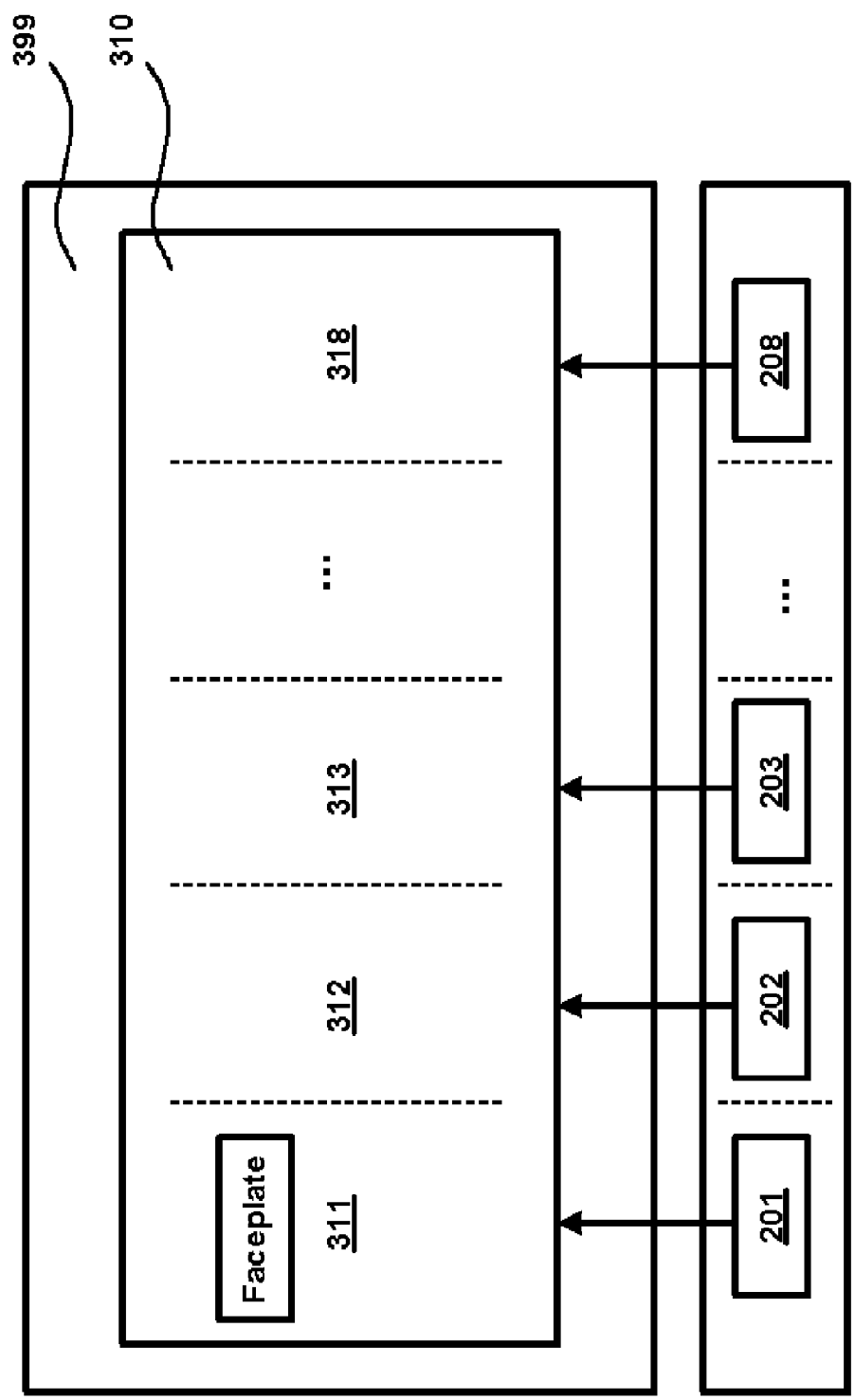
FIG. 3A is a block diagram illustrating the manner in which a POK is used in conjunction with a display to change the parameter values associated with multiple control loops in parallel in an embodiment of the present invention.

FIG. 2 is a diagram illustrating the layout of a POK in one embodiment, and FIG. 3A further illustrates the manner in which the keys are used. POK 120A of FIG. 2 is shown containing 8 groups 201-208 (disposed sequentially from left to right), fast key 230, lock 260 and status indicators 271-273. Each group in turn is shown containing raise key 251, lower key 252, normal mode key 253 and a manual mode key 254.

On the other hand, FIG. 3A shows that screen 399 contains display area 310 logically divided into eight faceplates (or portions) 311-318 respectively associated with eight groups 201-208 (disposed sequentially from left to right) of POK 120A. Each faceplate displays the status of a corresponding control loop, and the association implies that selection (e.g., pressing or touching) of the keys in a group affects only the control loop displayed in the corresponding faceplate, as described below.

An operator may first select either normal mode key 253 or manual mode key 254. Thereafter selection of raise key 251 and lower key 252 is interpreted in the context of the selected mode key. Thus, when the context is normal mode, the raise and lower keys relate to increasing/decreasing set point 191 of the corresponding control loop. Similarly, when the context is manual mode, the raise and lower keys relate to increasing/decreasing output 193, while ignoring the set point value.

Fast key 230 causes changes (increment or decrement) with a greater value when selected along with the corresponding raise key 251 or lower key 252.

Lock 260, provided according to an aspect of the present invention, can be placed in one of two positions. In a open position, POK is operable to provide inputs as described above. On the other hand, in a close position, no inputs are passed on path 112A from POK 120A.

Status indicator 271 contains a LED, which indicates whether power is supplied to POK 120A. Status indicator 272 contains another LED, which indicates any errors in selection of keys (e.g., both raise and lower keys are selected simultaneously). Status indicator 273 contains a buzzer, which is sounded to indicate errors along with status indicator 272.

Figure 3B:
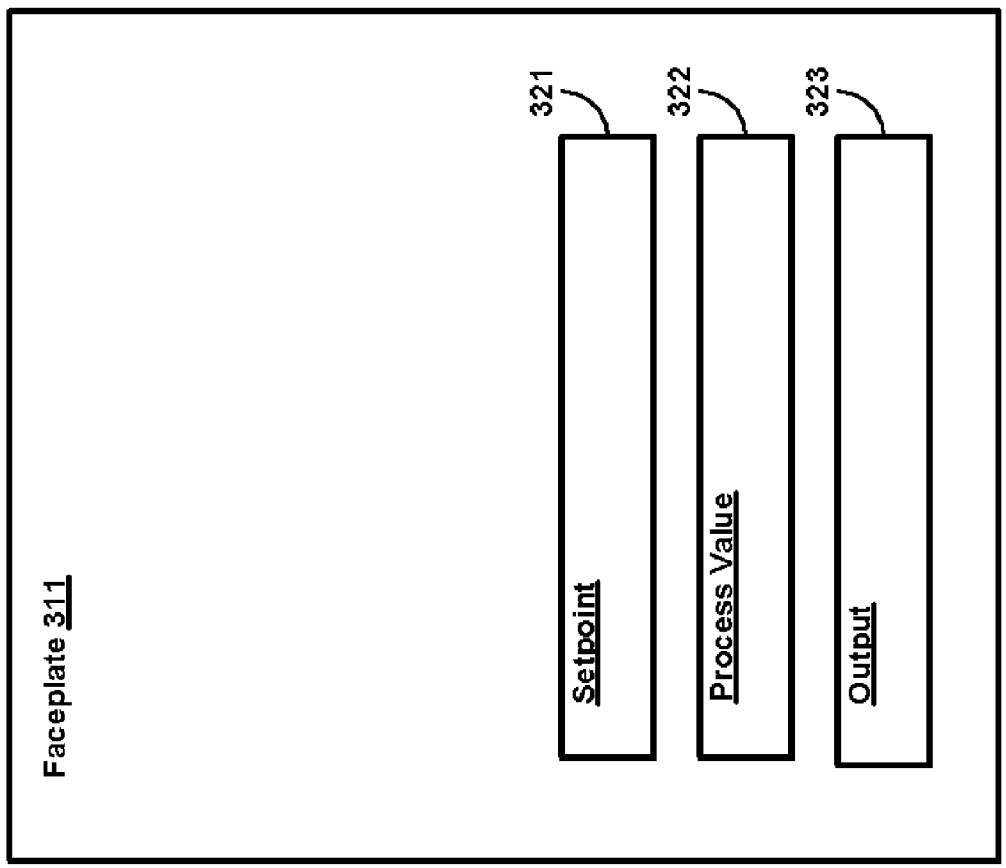
FIG. 3B is a diagram illustrating the display of status information related to a control loop in one embodiment.

As the user selects the above described keys, the display in each faceplate is shown/updated represented in FIG. 3B. Field 321 displays the present value of set point 191. Field 322 displays the present value of process value 192. Field 323 displays the present value of output 193. The values in the fields may be graphically represented, in addition, or in the alternative, using a suitable interface.

FIG. 3B may be alternatively be viewed as representing a display when GKB 130A is used by an operator. The operator is deemed to have selected faceplate 311 and thus only the status for the corresponding control loop is shown displayed. The keys on GKB (containing various keys such as numbers, alphabets, etc.) are then used to provide the appropriate inputs in field 321, etc.

The manner in which POK can be implemented, and the corresponding interfaces be supported, is described below with examples.

4. Parallel Operating Keyboard

Figure 4:
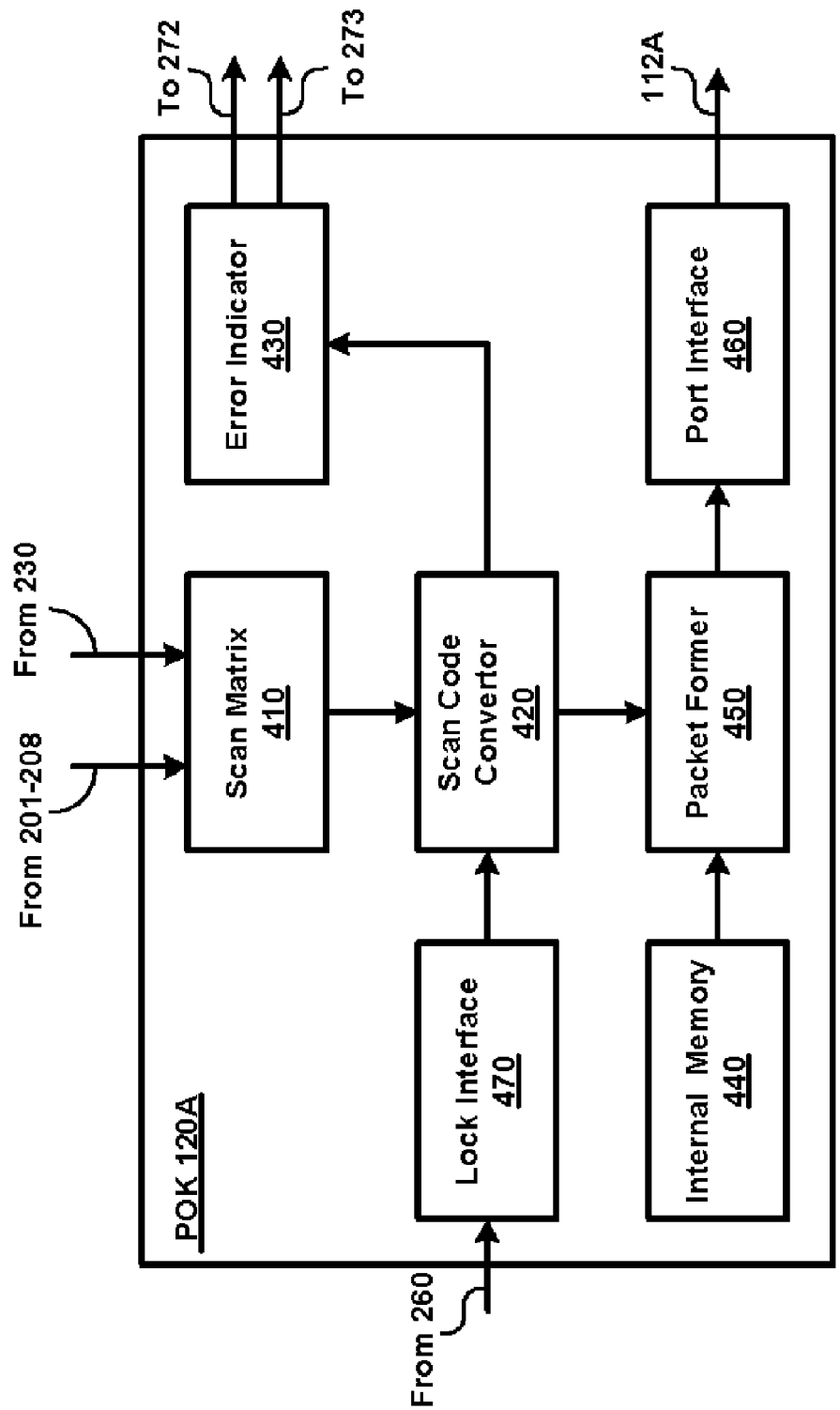
FIG. 4 is a block diagram illustrating the details of implementation of a POK (parallel operation keyboard) in one embodiment.

FIG. 4 is a block diagram illustrating the details of a parallel operating keyboard 120A in one embodiment. The block diagram is shown containing scan matrix 410, scan code converter 420, error indicator 430, internal memory 440, packet former 450, port interface 460, and lock interface 470. Each block is described below in further detail below.

Scan matrix 410 (or sensor in general) contains a set of keys (of groups 201-208 and 230) arranged in the form of a matrix, which enables identification of the pressing/touching (in general, selecting) and releasing of a key or a group of keys. Scan matrix 410 sends the details of the keys (the identifier of each key and whether the key is being pressed or released) to scan code converter 420.

Lock interface 470 provides an indication indicating whether lock 260 is in open or close position. Scan code converter 420 converts the details of the keys received from scan matrix 410 into predefined codes for the keys when lock interface 470 indicates that lock 260 is in open position. The key codes enable other devices and/or applications to identify the selected keys uniquely. Any coding mechanism can be used consistent with the interface of other blocks. The codes are sent to packet former 450. Scan code converter 420 also performs error detection and sends indications to error indicator 430 when an error is detected.

Error indicator 430 on receiving indication of errors from scan code converter 420 provides a predetermined form of feedback associated with the error to a user. For example, an error may be indicated by the blinking of a LED (272) or by sounding a buzzer (273). Internal memory 440 stores an identifier of the POK, along with any other information required by packet former 450. The POK identifier enables tracing of simultaneous commands to specific POKs from which the commands have been caused to be issued.

Packet former 450 receives key codes from scan code converter 420 and generates a packet containing information about the key codes and also the POK identifier. The generated packet is forwarded to port interface 460. It may be appreciated that the combination of scan matrix 410, scan code convertor 420 and packet former 450 may check for any keys selected (or pressed, in an embodiment) every few milliseconds and generate corresponding packets. Thus, when multiple keys are indicated to be selected by scan matrix 410 in such duration, the packet(s) sent may indicate that the corresponding keys are selected.

Port interface 460 provides connectivity to a network management station using protocols (such as RS232, USB) well known in the relevant arts. The packets received from packet former 450 are forwarded to the network management station described with an example below.

5. Operator Station

Figure 5:
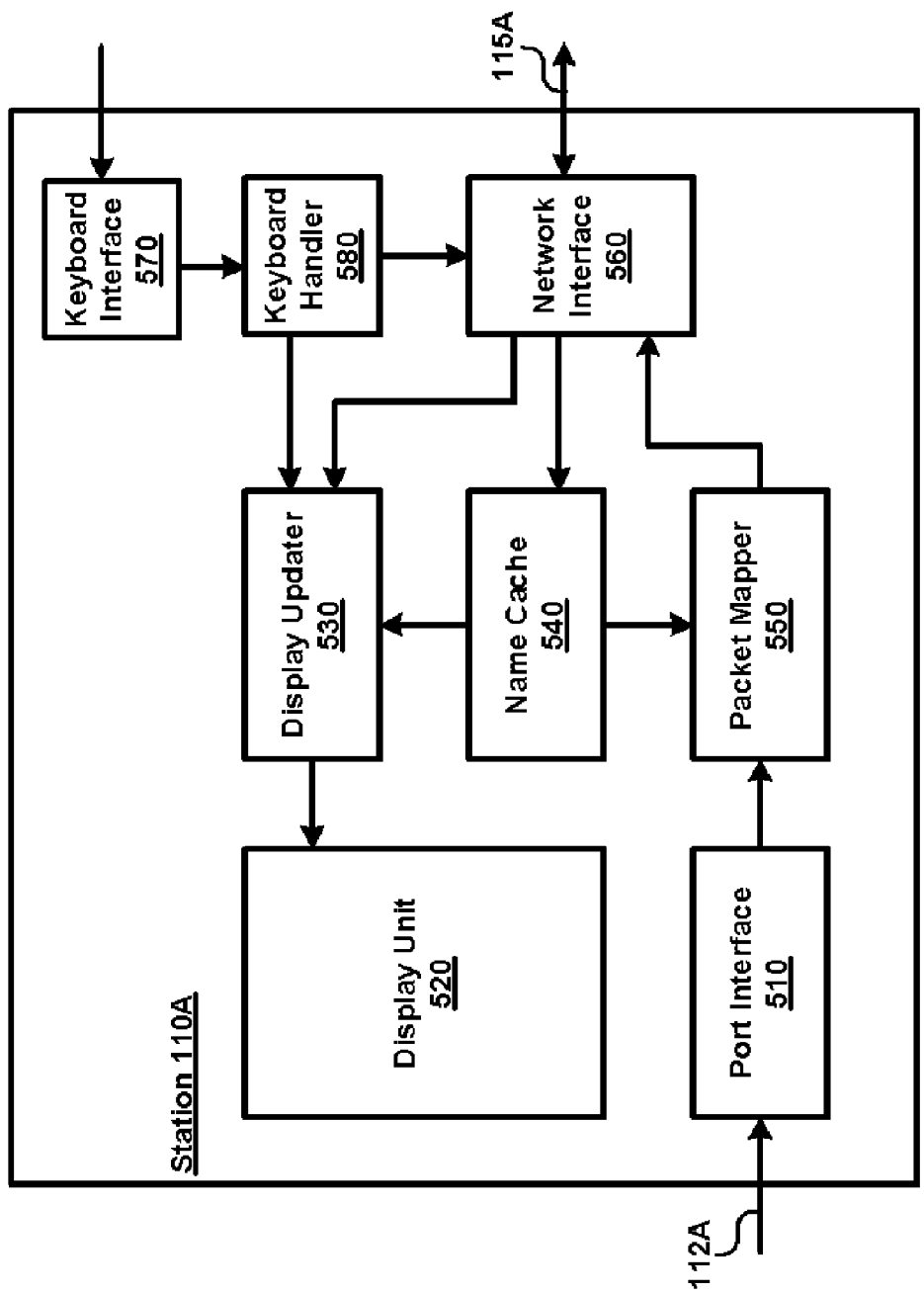
FIG. 5 is a block diagram illustrating the details of implementation of an operator station in one embodiment.

FIG. 5 is a block diagram illustrating the details of an operator station in one embodiment. The block diagram is shown containing port interface 510, display unit 520, display updater 530, faceplate name cache 540, packet mapper 550, network interface 560, keyboard interface 570 and keyboard handler 580. Each block is described below in further detail below.

Port interface 510 provides connectivity to POK 120A using protocols such as RS232, USB well known in the relevant arts. Network interface 560 provides electrical and protocol connectivity to a network (e.g., using Internet Protocol), and may be used to communicate with the other systems (such as server 150 via path 115A) of FIG. 1A.

Display unit 520 displays information about devices in the control network. Typically, the display area contains an area divided into multiple faceplates, with each faceplate displaying information relating to one control loop.

Keyboard interface 570 provides protocol interface to GKB 130A and indicates to keyboard handler 580 the specific keys selected by an operator. Keyboard handler 550 communicates with display updater 530 to update the display on display unit 520 if the selected keys relate to the display. On the other hand, when the selected keys are related to management of control loops, keyboard handler 570 forms packets indicating the specific keys selected, and sends the packets to server 150 via network interface 560.

Name cache 540 stores data indicating the names/identifiers of control loops and the sequence in which they are displayed on the faceplates (for later association with specific groups of keys) of display unit 520. The name cache is updated by server 150 via network interface 560.

Display updater 530 receives information (such as an identifier of a control loop, set point 191, process value 192, and output 193) about the control loops from server 150 via network interface 560. Display updater updates the faceplates of display unit 520 with received information using the data stored in name cache 540.

Packet mapper 550 receives packets from POK 120A via port interface 510. The keys contained in the packets are then mapped to the corresponding faceplates using the data stored in name cache 540. The mapped packets contain data indicating the control loop identifiers and the corresponding selected keys. Packet mapper 550 sends the mapped packets to server 150 via network interface 560.

Thus, mapped packets containing the control loop names and corresponding selected keys are sent from the station to the server, which processes the mapped packets. The details of an example server are explained below.

6. Server

Figure 6:
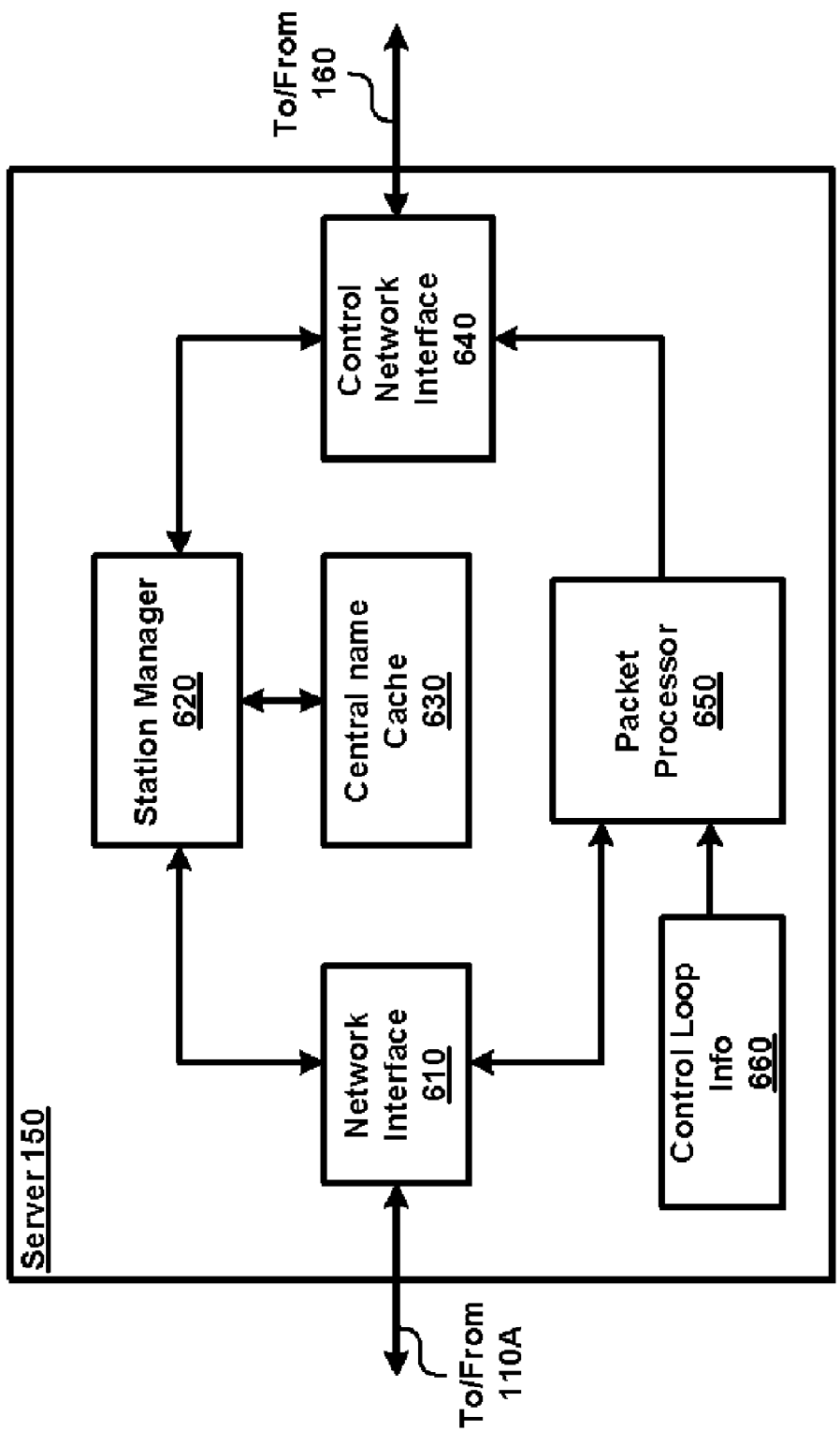
FIG. 6 is a block diagram illustrating the details of implementation of a server in one embodiment.

FIG. 6 is a block diagram illustrating the details of a server in one embodiment. The block diagram is shown containing network interface 610, station manager 620, central name cache 630, control network interface 640, packet processor 650, and control loop info 660. Each block is described below in further detail below.

Network interface 610 provides connectivity to a network (e.g., using Internet Protocol), and may be used to communicate with the other systems (such as operator stations 110A-

110N) of FIG. 1. Control network interface 640 provides connectivity to a control network using one of several appropriate protocols well known in the relevant arts, and may be used to communicate with the other systems (such as control system 180) of FIG. 1A.

Central name cache 630 stores data indicating the control loop identifiers, the specific operator stations subscribing to each control loop, and the corresponding status information that is to be displayed associated with each control loop. Station manager 620 may update the information as described below.

Station manager 620 receives request for information about control loops and processes the requests. The requests can be either one-time information requests or to subscribe for updates. Station manager 620 examines the information in central name cache 630 to determine whether the requested information is already available and provide the information to the requesting operator station via network interface 610.

In case of subscription, station manager 620 stores information in central name cache 630 indicating the specific control loops subscribed by each operator station. Station manager 620 periodically requests control system 180 for information on each of the control loops subscribed to, and updates the central name cache 630 with the received information. The subscribing operator stations (display updater 530) may be periodically updated with the information in central name cache 630.

An operator station may send a group identifier to subscribe to a group of control loops, and station manager 620 may access pre-configured data (e.g, in a database or non-volatile memory, not shown) indicating the control loops identified by the group identifier. Station manager 620 sends the control loop identifiers to name cache 540 of the subscribing operator station.

Control loop info 660 stores (e.g., in a non-volatile memory) information about each control loop present in the control network. The information may contain loop details such as the unit of increment or decrement (when a raise/lower key is selected once) without the fast key selection, as well as with fast key selection, any maximum and minimum limits for the set points, process values and output.

Packet processor 650 receives packets from operator stations (such as 110A to 110N) via network interface 610. The content of the each packet may be verified for correctness (i.e., checking whether within permissible limits) using the information stored in control loop information 660. Packet processor 650 transforms the information available in the verified packets to a format required by the control network. The transformed information is sent to control system 180 via control network interface 640.

Thus, server receives mapped packets from various stations and converts them to information that can be processed by the control network, specifically the control system that controls the devices.

Also, while the lock feature is described as being provided by operation of lock interface 470 and lock 260, it should be appreciated that the corresponding feature can be implemented in software as well. For example, upon appropriate inputs from an operator, packet processor 650 may ignore the keystrokes from POK, thereby disabling the simultaneous control of control loops. The disabling feature can be implemented within operator stations as well.

Also, the features described above can be implemented in various embodiments. The description is continued with respect to an embodiment in which various features of the present invention are operative by execution of appropriate software instructions.

7. Software Implementation

Figure 7:
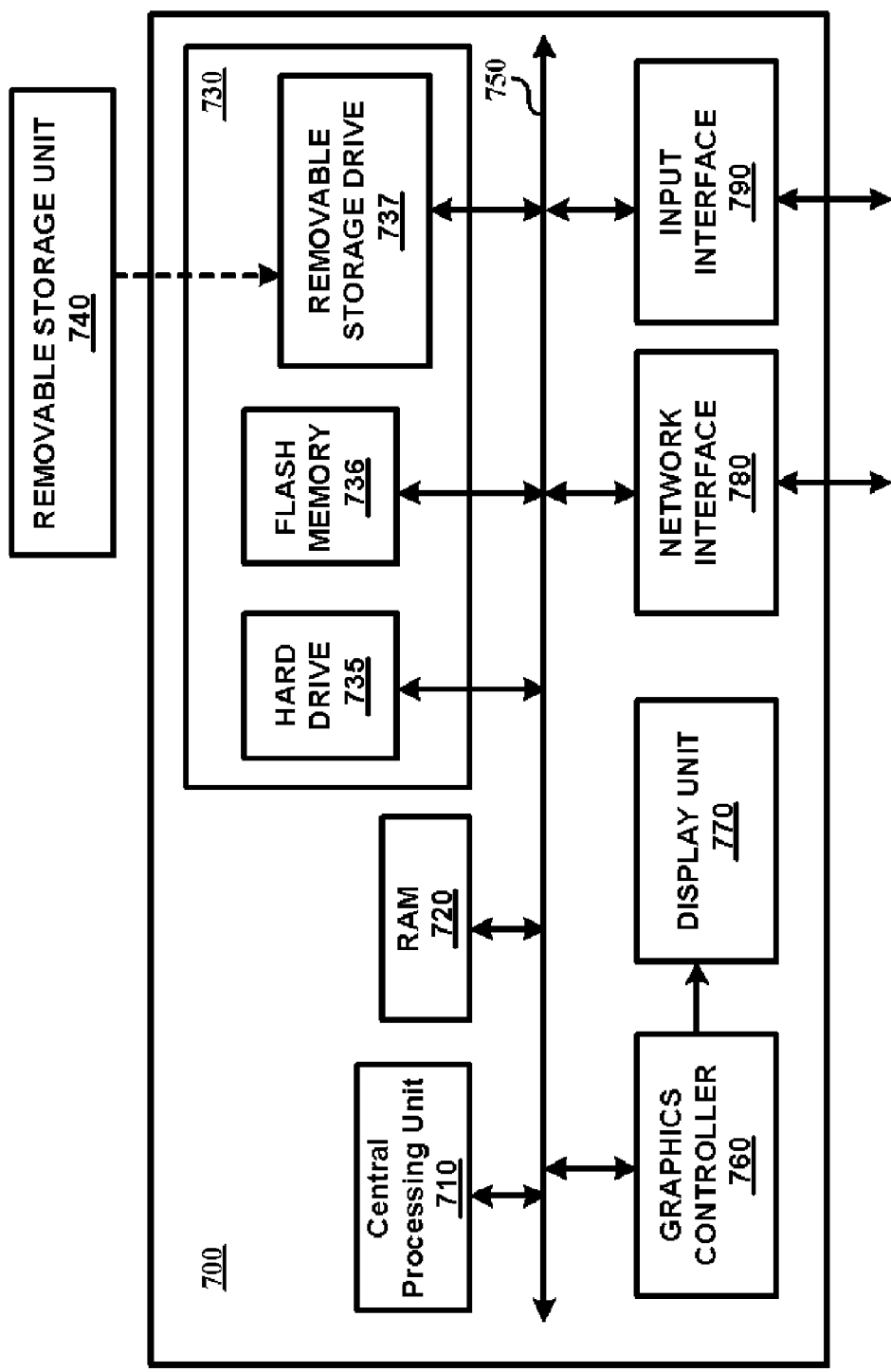
FIG. 7 is a block diagram illustrating the details of an embodiment in which various aspects of the present invention are operative by execution of software instructions in an embodiment of the present invention.

FIG. 7 is a block diagram illustrating the details of digital processing system 700 implemented substantially in the form of software in an embodiment of the present invention. System 700 may correspond to one of operator stations 110A-110N and central server 150. System 700 may contain one or more processors such as central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general purpose processing unit. RAM 720 may receive instructions from secondary memory 730 using communication path 750.

Graphics controller 760 generates display signals (e.g., in RGB format) to display unit 770 based on data/instructions received from CPU 710. Display unit 770 contains a display screen to display the images defined by the display signals. Input interface 790 may contain a single key-board integrating both the POK and GKB described above, with POK features (of simultaneous commands) being disabled on lock. Alternatively, input interface may contain the two keyboards as separate units as shown in FIG. 1A. Input interface 790 may contain devices such as mouses, in addition. Display unit 770 and input interface 790 enable a operator to interact with system 700 and manage the field devices.

Network interface 780 provides the physical, electrical and protocol interfaces needed for each system. In the case of operator stations 110A-110N, a network connection to communicate on a local area network (to which server 150 is also connected) using protocols such as TCP/IP may be sufficient. On the other hand, in case of central server 150, in addition to such a network connection, a control network connection to interface with control network 160 may be necessary.

Secondary memory 730 may contain hard drive 735, flash memory 736 and removable storage drive 737. Secondary memory 730 may store the data (e.g., DD data provided according to the common format, DD files, etc.) and software instructions, which enable system 700 to provide several features in accordance with the present invention. Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable storage medium having stored therein computer software and/or data.

In this document, the term "computer program product" is used to generally refer to removable storage unit 740 or hard disk installed in hard drive 735. These computer program products are means for providing software to system 700. CPU 710 may retrieve the software instructions, and execute the instructions to provide various features of the present invention described above.

8. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of enabling an operator to control the operation of a process control plant, a control process in said process control plant being defined according to a plurality of control loops, said method being performed in a system, said method comprising:

enabling operators to select a first key and a second key simultaneously, wherein said first key and said second key are respectively associated with a first control loop and a second control loop in said process control system, and are contained in a keyboard communicatively coupled to said system; and sending data to change a state of said first control loop in response to said simultaneous selection of said first key and a state of said second control loop in response to said simultaneous selection of said second key, wherein said first control loop and said second control loop are comprised in said plurality of control loops, and wherein ability to select said first key and said second key simultaneously enhances the speed with which operators can provide inputs in the management of said process control plant.

2. The method of claim 1, wherein said system comprises a network management station with which said operator directly interfaces, said enabling further comprises:

displaying a present state of said first control loop in a first portion of a display screen and a present state of said second control loop in a second portion of said display screen;

interfacing with said keyboard to receive data indicating that said first key and said second key were selected; and associating selection of said first key with said first control loop by virtue of display in said first portion and selection of said second key with said second control loop by virtue of display in said second portion.

3. The method of claim 2, wherein said displaying displays a status related to each of said plurality of control loops is a corresponding plurality of portions on said display in a first sequence, said keyboard also containing a plurality of groups of keys disposed in a second sequence, said plurality of groups including a first group containing said first key and a second group containing said second key, said associating associates the state of each control loop displayed in each portion with the corresponding one of said plurality of groups in the same sequence.

4. The method of claim 2, wherein said sending sends data to a server indicating selection of said first key and said second key, said method further comprising:

receiving data from said server indicating a change of state of said first control loop to a new state; and updating said display screen to indicate that said first control loop is in said new state.

5. The method of claim 1, wherein said system comprises a server, wherein said enabling comprises receiving data indicating that said first key and said second key have been selected from a network management station, wherein said sending comprises forwarding commands to a control system to change said state from a present state to a new state.

6. The method of claim 5, wherein said state comprises a level which can take one of multiple values within a range, wherein said first key indicates one of increase request or decrease request, said method further comprising:

determining a delta value by which said level has to be changed; and forwarding a first command to said control system to change said level by said delta value.

7. The method of claim 6, wherein said first key is contained in a group of keys associated with said first control loop, said method further comprising:

receiving data indicating that a fast key on said keyboard also has been selected simultaneously by said operator, wherein said determining determines said delta value with a higher value when said fast key is selected than when said fast key is not selected.

8. The method of claim 1, further comprising:

receiving a lock indication indicating that simultaneous selection of said first key and said second key is disabled;

receiving another indication that said first key and said second key are selected; and leaving unchanged said first control loop and said second control loop in spite of receiving said another indication in view of said lock indication.

9. The method of claim 1, further comprising:

enabling operators to select said first key and said second key one at a time, and causing said same change to said state of said first control loop in response to selection of said first key and said same change to said state of second control loop in response to selection of said second key.

10. A computer readable medium carrying one or more sequences of instructions for causing a system to enable an operator to control the operation of a process control plant, a control process in said process control plant being defined according to a plurality of control loops, wherein execution of said one or more sequences of instructions by one or more processors contained in said system causes said one or more processors to perform the actions of:

enabling operators to select a first key and a second key simultaneously, wherein said first key and said second key are respectively associated with a first control loop and a second control loop in said process control system, and are contained in a keyboard communicatively coupled to said system; and sending data to change a state of said first control loop in response to said simultaneous selection of said first key and a state of said second control loop in response to said simultaneous selection of said second key, wherein said first control loop and said second control loop are comprised in said plurality of control loops, and wherein ability to select said first key and said second key simultaneously enhances the speed with which operators can provide inputs in the management of said process control plant.

11. The computer readable medium of claim 10, wherein said system comprises a network management station with which said operator directly interfaces, said enabling further comprises:

displaying a present state of said first control loop in a first portion of a display screen and a present state of said second control loop in a second portion of said display screen;

interfacing with said keyboard to receive data indicating that said first key and said second key were selected; and associating selection of said first key with said first control loop by virtue of display in said first portion and selection of said second key with said second control loop by virtue of display in said second portion.

12. The computer readable medium of claim 10, wherein execution of said one or more sequences of instructions by one or more processors contained in said system causes said one or more processors to further perform the actions of:
enabling operators to select said first key and said second key one at a time, and causing said same change to said state of said first control loop in response to selection of said first key and said same change to said state of second control loop in response to selection of said second key.

13. A keyboard for enabling a user to provide inputs to an external system, said keyboard comprising:
a plurality of keys including a first key and a second key;
a sensor detecting that said first key and said second key are selected simultaneously by said user;
a host interface sending data to said external system indicating that both said first key and said second key are selected simultaneously; and
a lock which in one position prevents said data being sent and does not prevent said data being sent in another position, whereby said data is not sent to said external system when both of said first key and said second key are selected simultaneously if said lock is in said one position,
wherein said lock is provided in the form of a single unit within said keyboard to only provide said user the choice of preventing or not preventing said data to said external system, said lock not being used to provide inputs by said user to said external system.

14. The keyboard of claim 13, further comprising a packet forming block which forms one or more packets indicating that said first key and said second key have been selected, wherein said data sent by said host interface comprises said one or more packets.

15. The keyboard of claim 13, wherein said plurality of keys contains a set of keys other than said first and said second key,
wherein said lock in said one position prevents data from being sent to said external system even if any of set of keys are selected.

16. A system enabling an operator to control the operation of a process control plant, said process control plant containing a plurality of control loops, said system comprising:
a first keyboard interface designed to receive data indicating that a first key and a second key are selected simultaneously by an operator, wherein said first key and said second key are contained in a first keyboard communicatively coupled to said system;
a second keyboard interface designed to receive data indicating that a third key and a fourth key are selected by said operator in sequence only, wherein said third key and said fourth key are contained in a second keyboard communicatively coupled to said system; and
a network interface designed to send data to change a state of a first control loop in response to selection of said first key, a state of said second control loop in response to selection of said second key, a state of a third control loop in response to selection of said third key, a state of said fourth control loop in response to selection of said fourth key,
wherein said first control loop, said second control loop, said third control loop and said fourth control loop are comprised in said plurality of control loops, and
wherein ability to select said first key and said second key simultaneously enhances the speed with which operators can provide inputs in the management of said process control plant,
wherein said second keyboard interface enables management of said process control plant when said first keyboard is not available.

17. The system of claim 16, wherein said system comprises a network management station with which said operator directly interfaces, said system further comprises:
a display unit to display a present state of said first control loop in a first portion of a display screen and a present state of said second control loop in a second portion of said display screen; and
a processing block associating selection of said first key with said first control loop by virtue of display in said first portion and selection of said second key with said second control loop by virtue of display in said second portion.

* * * * *